United States Patent
Boffa et al.

[15] 3,678,053
[45] July 18, 1972

[54] 6,15 DIALKOXY 5,14 DIAZO ISO VIOLANTHRONES

[72] Inventors: Gioacchino Boffa, Novara; Argento Crotti, Cogliate; Giampiero Pieri, Saronno; Angelo Mangini; Antonio Tundo, both of Bologna, all of Italy

[73] Assignee: Montecatini Edison S.p.A., Milan, Italy

[22] Filed: Aug. 5, 1970

[21] Appl. No.: 69,519

[30] Foreign Application Priority Data

Aug. 5, 1969 Italy.............................20581 A/69
June 10, 1970 Italy.............................25757 A/70

[52] U.S. Cl..............................260/272, 8/54.2, 106/288 Q, 260/278
[51] Int. Cl. ........................................C07d 39/00
[58] Field of Search............................260/272, 278

[56] References Cited
FOREIGN PATENTS OR APPLICATIONS

635,925  10/1936  Germany...............................260/272

*Primary Examiner*—Donald G. Daus
*Attorney*—Stevens, Davis, Miller & Mosher

[57] ABSTRACT

A novel class of compounds are provided which are 6,15-dialkoxy-5,14-diaza-isoviolanthrones. The compounds are synthesized from 1-aza-2-hydroxy-benzanthrone via a novel process comprising bromination of the starting material to form 1-aza-2-hydroxy-3-bromo-benzanthrone; the hydroxy group is then alkylated, followed by treatment with sodium sulfide to produce novel intermediates of the invention, 3,3-thio-bis(1-aza-2-alkoxy-benzanthrones).

The 6,15-dialkoxy-5,14-diaza-isoviolanthrones of this invention are excellent blue vat dyes, which yield bright blue shades on cellulosic fibers. The dyeings have been found to possess excellent fastness properties.

8 Claims, No Drawings

6,15 DIALKOXY 5,14 DIAZO ISO VIOLANTHRONES

This invention relates to novel vat dyes, their use and a method for their preparation, including a novel intermediate compound of that preparation.

Although many compounds have been proposed in the art as vat dyes for cellulosic fibers, efforts continue to discover dyes which product bright blue shades and furthermore have excellent fastness properties. Although blue vat dyes have been known in the art for some time, the increasing demands of consumers for better fastness properties has made the search for bright blue dyes having such properties a matter of increased importance. Dyes which possess both fastness to light and also fastness to chlorine and chlorite treatment are thus in much demand.

It is therefore an object of this invention to provide new compounds which are suitable for dyeing cellulosic fibers from the vat in bright blue shades and which dyeings have excellent fastness properties.

A further object of this invention is to provide cellulosic fibers dyed in bright blue shades with excellent fastness properties.

A further object of this invention is to provide a novel process for the production of blue vat dyes.

A further object of this invention is to provide an improved dyeing process for cellulosic fibers.

A further object of this invention is to provide novel intermediate compounds for the production of blue vat dyes.

The objects of this invention are achieved through the provision of novel blue vat dyes which are 6,15-dialkoxy-5,14-diaza-isoviolanthrones (which also may be termed 6,-5-dialkoxy-5,14-diaza-dinaphto [1,2,3-cd;1',2',3'1m]perylene-9,18-diones) of the formula

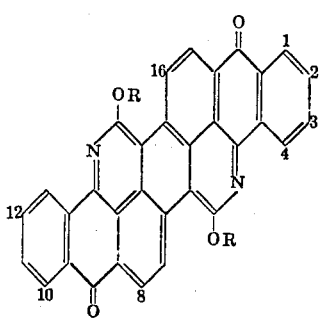

(I)

wherein R is a lower alkyl group of one to four carbon atoms. As such alkyl groups may be mentioned methyl, ethyl, n-propyl, isopropyl, n-butyl, sec-butyl and tert-butyl.

The 6,15-dialkoxy-5,14-diaza-isoviolanthrones may be synthesized from 1-aza-2-hydroxy-benzanthrone according to the reaction scheme illustrated below. (The starting material, 1-aza-2-hydroxy-benzanthrone, may be prepared according to the procedure set forth in copending application Ser. No. 16,989, filed Mar. 5, 1970.)

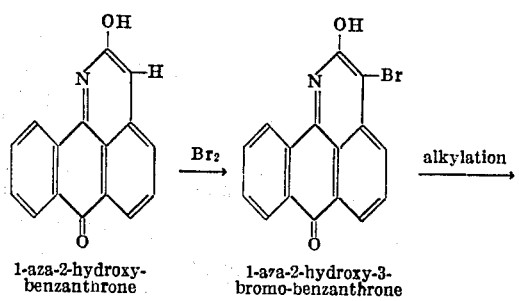

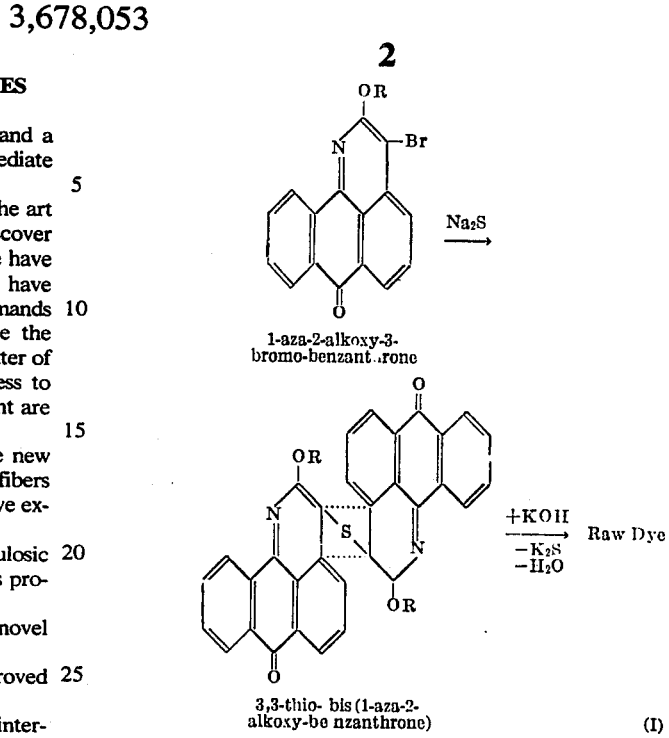

The synthesis of the 6,15-dialkoxy-5,14-diazaisoviolanthrones is advantageously carried out according to the following procedure:

a. Bromination

Into a solution of 1-aza-2-hydroxy-benzanthrone in concentrated sulphuric acid (90–98 percent) a quantity of bromine is added which is slightly above the stoichiometric amount, preferably about 5 to 25 percent. The temperature is raised to 40°–50C and the mass allowed to react for an extended period of several hours. Other solvents can be used in place of sulfuric acid such as acetic acid. It has been discovered that excellent results are achieved through the use of concentrated sulphuric acid which is therefore preferred. The bromine derivative thus obtained is isolated by diluting the reaction mass with water which is thereafter filtered and the resulting cake is washed with water until the filtrate is neutral. The cake is then dried.

b. Alkylation

The bromine derivative of step (a) is converted into the alkoxy derivative by treating at a temperature of between about 50° and about 150°C in an organic solvent with an alkylating agent in the presence of an acid acceptor. As a preferred organic solvent may be mentioned dimethylformamide (DMF). Preferred alkylating agents are dialkylsulfates and alkyl toluensulfonates. As a preferred acid acceptor may be mentioned sodium carbonate.

As exemplary of this procedure, the methoxy derivative (R = methyl) is obtained by treating the moist paste of the bromo-hydroxy-derivative with an excess of dimethyl-sulfate (2–4 moles) at a temperature of 30°–50°C, in the presence of an excess of a dilute alkaline hydroxide.

The bromo-alkoxy-derivative may be isolated from the reaction mass by cooling, filtering, and washing first with DMF and then with water. The product may then be dried.

c. Sulfuration

An approximately stoichiometric amount of alkaline sulfide or polysulfide, preferably the sodium or potassium derivative, is added to the reaction mars in DMF, which is then heated to 100°–150°C. It is preferred that the reaction take place in an inert gas atmosphere, for about 1 to 2 hours.

The mixture is cooled to 30°–40°C, the formed precipitate is filtered and washed with the solvent (DMF). The solvent is then removed, the residue is washed with water and thereafter dried in an oven. The sulfuration may be carried out on the isolated alkoxy-derivative which is suspended either in DMF, an alkanol or water.

d. Alkaline condensation

The thiobis-(aza-alkoxy-benzanthrone) obtained in step (c) is subjected to an alkaline condensation by heating under reflux, for an extended period of several hours under a nitrogen atmosphere with an alkali hydroxide in an alkanol solvent. The preferred alkali hydroxide is potassium hydroxide used in excess (10–40 moles per mole of sulfide). The preferred alkanol solvents are butyl alcohol and isobutyl alcohol.

At the end of the reaction, the solvent is distilled with steam, and air is blown into the hot mass, which is hot-filtered; the cake is washed with water, until the filtrate is neutral, and then dried at about 80°–120°C.

e. Purification

The raw dye is purified by boiling for an extended period of several hours in an inert solvent having a boiling point over 200°C such as nitrobenzene with an alkyltoluensulfonate (about equal weight as the dye) in the presence of an acid acceptor such as anhydrous sodium carbonate. The suspension is filtered at a temperature ranging from about 20° to 150°C. The cake is washed with the solvent used in the purification, and then the solvent is removed from the cake. The residue is washed with hot water until neutral and it is then dried. The purified dyes according to formula I are thus obtained. They appear as blue or violet-blue powders with a melting point over 400°C. They are practically insoluble in all the common organic solvents; in boiling 1-chloro-naphthalene they show a low solubility (lower than 1 g/l).

A simplified method for obtaining the dyes consists in carrying out the alkaline melting (d) directly on the bromo-alkoxy-derivative; in this way the sulfuration (c) is not carried out. The raw dye thus obtained is purified as in (e) and it shows in its pure state the identical chemical structure and similar dyeing properties with respect to the corresponding dye prepared via the above sulfide process.

A dried and ground dye and also the fine paste give a blue vat and dye cellulosic fibers with a bright blue shade after reoxidation in air. The dyeing method has been described in various publications:

The Society of Dyers and Colorists; the American Association of Textile Chemists and Colorists; Color Index, Vol. 2 (1956), page 2,423, Dyeing Text I;

K. Venkataraman — "The Chemistry of Synthetic Dyes", Vol. 2 (1952), page 872 — Academic Press Inc., New York;

(Method IN of I. G. Farbenindustries);

Method RN of ACNA. (Color Index A/Q1).

Two other methods for the application of the dyes I as vat dyes for cotton are described in Examples 6 and 7. These dyes display an excellent fastness to light, comparable, for instance to those of Romantrene BC blue of ACNA (Color Index: Vat Blue 6) No. 69,825). The resistances to chlorine and to chlorite are much higher than those of the known blue vat dyes.

As noted above, the compounds of this invention are suitable for dyeing cellulosic fibers. As cellulosic fibers may be mentioned both natural and synthetic fibers. As natural cellulosic fibers may be mentioned cotton, jute, hemp, and linen. As synthetic cellulosic fibers may be mentioned viscose (rayon) and cellulose acetate. The new compounds are also useful as pigments for coloring paper pulp C (e.g. for soap wrapping papers and printed wall papers), plastics (e.g. rubber and polyvinyl-chloride), and paints, varnishes, lacquers, and enamels.

The following examples are given for purposes of illustration and are not to be considered as limiting the scope of the invention, reference being had to the appended claims for this purpose.

EXAMPLE 1

16 grams of 1-aza-2-hydroxy-benzanthrone were dissolved at room temperature in 160 g of 96 percent sulfuric acid. This mixture was heated to 50°–55°C, and then 11.2 g of bromine were fed under stirring. The whole mass was kept at 50°–55°C for 4 hours. The reaction mass was poured into water and filtered; the residue was washed with water until the filtrate was neutral and then dried at 80°–120°C.

19.8 g of a violet powder were obtained, consisting of 1-aza-2-hydroxy-3-bromo-benzanthrone having a melting point of 285°C with decomposition.

10 g of this intermediate product were dissolved at 60°–78 °C in 56.5 of dimethyl-formamide (DMF). At this temperature 4.9 g of $Na_2CO_3$ and 71. g of diethylsulfate were added. The mixture was kept under stirring at 60°–70°C for 15 minutes.

The reaction mass contained 1-aza-2-ethoxy-3-bromo-benzanthrone (yellow crystals from DMF, m. p. 182°–182.5 °C).

2.1 g of finely ground $Na_2S$ at 60 percent were introduced at 60°–70C in the reaction mass, nitrogen was fed to saturation and the whole was heated under reflux (about 140°C) for 2 hours. After cooling to 30°–40°C the yellowish-orange precipitate thus formed was filtered, washed with cold DMF until obtaining a colorless filtrate. The filtrate was washed with water and dried at 80°–120°C. 7.3 g of a yellowish-pink powder were obtained, consisting of 3,3'-thiobis(1-aza-2-ethoxybenzanthrone) with a melting point over 360°C.

5 g of this intermediate product and 0.5 g of Rodite A (stabilized sodium hydrosulfite of Montecatini Edison) were introduced into a solution at 85°–90°C of 12 g of KOH in 33 g of isobutanol under stirring. Nitrogen was fed to saturation, followed by heated under reflux (about 120°C) for 3 hours. The mixture was diluted with 100 g of water and the solvent was removed by distillation in a steam current.

A flow of hot air was introduced for 30 minutes, the mass was filtered, washed until neutral with boiling water, and dried.

5.3 g of raw dye that had been ground and finely sieved were obtained. The dye was dispersed under vigorous stirring in 60 g of nitrobenzene, 2.5 g of ethyl p-toluensulfonate and 1.25 g of anhydrous sodium carbonate. The whole was heated at reflux (212°C) under a vigorous stirring for 3 hours, and thereafter cooled to 30°-40°C, and filtered. The resulting cake was washed with nitrobenzene to obtain a soft blue filtrate. The solvent was removed from the cake by steam distillation and hot filtered, washed with hot water until the filtrate was neutral, and dried. 3.95 g of the purified dye, 6,15-diethoxy-5,14-diaza-isoviolanthrone (formula I with $R = C_2H_5$) where obtained.

This dye, when applied according to the procedure of Example 6, gave a dyeing on cotton which was both very deep and of a bright shade. The dyeing possesses excellent fastness properties.

EXAMPLE 2

16.3 g of 1-aza-2-hydroxy-3-bromo-benzanthrone (prepared according to Example 1, 10.6 g of $Na_2CO_3$ and 21.2 g of n-propyl p-toluensulfonate were heated for 30 minutes to 100°–110°C. The mixture was cooled to room temperature, filtered, washed with DMF, and then with hot water, and finally dried.

8 g of a yellow powder found to be of 1-aza-2-n-propoxy-3-bromo-benzanthrone was obtained. It had a melting point of 130°–132°C.

6.62 g of this intermediate product was heated at reflux for 2 hours under a nitrogen atmosphere with 1.23 g of $Na_2S$ at 60 percent in 100 g of DMF. The reaction product yielded, after isolation by cold filtration (according to the procedures described in Example 1 4.73 g of 3,3'-thiobis (1-aza-2-n-propoxy-benzanthrone), a reddish-yellow powder having a melting point 319°–321°C.

From this intermediate, operating exactly as described in Example 1, with the same weight ratios of the corresponding agents used, the purified dye 6,15-di-n-propoxy-5,14-diazaisoviolanthrone (formula I with $R = C_3H_7$) was obtained.

Dyeings with this compound display similar fastness and a shade greener than that of the dye described in Example 1 when applied to cotton according to Example 7.

EXAMPLE 3

16.3 g of 1-aza-2-hydroxy-3-bromo-benzanthrone (prepared according to Example 1, 21.2 g of n-butyl p-toluensulfonate 10.6 g of $Na_2CO_3$ and 100 g of DMF were heated for 1 hour to 150°C. After cooling to 30°–40°C and isolation according to the procedures described in Example 2, 14 g of a yellow powder were obtained, having a melting point of 154°–155°C with decomposition, consisting of 1-aza-2-butoxy-3-bromo-benzanthrone.

10 g of this intermediate product was heated at reflux for 2 hours under a nitrogen atmosphere in 80 g of DMF in the presence of 1.79 g of $Na_2S$ at 60 percent. There was isolated, operating according to the procedures described in the preceding example, 7.3 g of 3,3'-thiobis(1-aza-2-butoxy-benzanthrone), a yellowish-orange powder having a melting point over 350°C. From this intermediate product, operating according to the procedures described in the preceding examples, there was obtained a purified dye, 6,15-dibutoxy-5,15-diaza-isoviolanthrone (formula I with $R = C_4H_9$). The dyeings were similar to the dye described in Example 2, when applied to cotton according to the procedures described in Example 7.

EXAMPLE 4

16.3 g of 1-aza-2-hydroxy-3-benzanthrone (prepared according to Example 1), 21.2 g of isobutyl p-toluensulfonate, 16.6 g $Na_2CO_3$ and 100 g of DMF were heated for 1 hour to 150°C. After cooling to 30°–40°C, 12 g a yellowish powder was isolated according to the procedures described in the foregoing examples, having a melting point of 138°–138.5 °C. The compound was found to be 1-aza-2-isobutoxy-3-bromo-benzanthrone.

10 g of this intermediate product, heated under reflux for 2 hours under a nitrogen atmosphere in 80 g of DMF containing 1.79 g of $Na_2S$ at 60 percent, yielded, operating according to the procedures described in the foregoing example, 6.9 g of 3-3'-thiobis (1-aza-2-isobutoxy-benzanthrone), a gold yellow powder having a melting point over 350°C.

From this intermediate product operating according to the procedures described in the foregoing examples, the purified dye was obtained, 6,15-diisobutoxy-5,14-diaza-isoviolanthrone (formula I with $R = C_4H_9$), which behaved as the dye described in Examples 2 and 3, when applied on cotton according to the procedure of Example 7.

EXAMPLE 5

20 g of 1-aza-2-hydroxy-3-bromo-benzanthrone was ethoxylated as described in Example 1; the reaction mass was cooled to room temperature, filtered, washed with DMF, then with hot water until neutral and dried. Yellow crystals of 1-aza-2-ethoxy-3-bromo-benzanthrone having a melting point of 182°–182.5°C was obtained.

10 a of this intermediate product was heated to reflux temperature under a nitrogen atmosphere for 5 hours, in 70 cc of isobutanol with 4 g Rodite A (stabilized sodium hydrosulfite) and 20 g of potassium hydroxide. After dilution of the reaction mass with 200 cc of water and distillation of the solvent with a steam current, air was introduced at the boiling temperature for 10 minutes. Thereafter the mass was filtered; the residue was washed with boiling water until the filtrate was neutral and then dried.

7.8 g of raw dye were obtained which yielded 1 gram of the purified dye by following the procedure of Example 1 where purification is effected by boiling in nitrobenzene in the presence of anhydrous $Na_2CO_3$ and ethyl-p-toluensulfonate. The purified dye is 6,15-diethoxy-5,14-diaza-isoviolanthrone (formula I with $R = C_2H_5$) similar to that prepared according to Example 1.

EXAMPLE 6

0.05–0.1 g of 6,15-diethoxy-5,14-diaza-isoviolanthrone (prepared according to Examples 1 and 5) were mixed with several drops of denatured ethanol and 3 drops of a 65 percent solution of sodium sulforicinoleate (the vat-mother liquor). 20 cc of water and 5 cc of NaOH 36° Be were added, then the whole was heated to 62°–65°C, 1 g of sodium hydrosulfite was added cotton was vat dyed for 5 minutes at 62°–65°C. The volume was completed with water containing 50 cc/l of NaOH 36° Be and 10 g/l of sodium hydrosulfite, it was heated again to 65°C and dyed for 40–45 minutes with a ratio cloth/bath equal to 1/30.

After air oxidation of the dyed material, this was soaped at the boiling temperature for 30 minutes with a ratio cloth/bath = 1/50.

The bath was constituted by a solution containing 2 g/l of DIAPON T (sodium oleyl-methyl-taurinate of Montecatini Edison) and 2 g/l of sodium carbonate.

After rinse and drying in air, the manufactured article had a very deep and bright blue shade having excellent general fastness properties.

EXAMPLE 7

The procedure of Example 6 was repeated except that the compound of Example 2, 6,15-di-n-propoxy-5,14-diaza-isoviolanthrone was used as the dyestuff. In addition, 5 cc of pyridine was added to the condensed solution of the vat mother liquor.

Following this procedure cotton was dyed with the 6,15-di-n-propoxy-5,14-diaza-isoviolanthrone.

EXAMPLE 8

The procedure of Example 7 was repeated except that the compound of Example 3 was used as the dye, 6,15-di-n-butoxy-5,14-diaza-isoviolanthrone. Similar dyeings on cotton are achieved.

EXAMPLE 9

The procedure of Example 7 was repeated, using as the dye the compound of Example 4, 6,15-diisobutoxy-5,14-diaza-isoviolanthrone, to produce dyeings on cotton of comparable quality.

EXAMPLE 10

10 g of 1-aza-2-hydroxy-3-bromo-benzanthrone, prepared as in Example 1, was methylated in 56.5 g of DMF and in the presence of 4.9 g of $Na_2CO_3$ with 5.8 g of dimethylsulfate, also according to the procedure of Example 1. To the reaction mass containing yellow crystals of 1-aza-2-methoxy-3-bromo-benzanthrone (crystals from DMF; m.p. = 257°–260°C), 2.1 g of finely ground $Na_2S$ at 60 percent were added at 60°–70°C, nitrogen was fed to saturation and the mixture was heated at reflux for 2 hours. According to the procedure of Example 1, 6.8 g of yellowish-pink powder was isolated that was determined to be 3,3'-thiobis (1-aza-2-methoxy-benzanthrone), having a m.p. over 360°C.

5 g of this intermediate product, subjected to alkaline melting and subsequent purification according to the procedures of Example 1, constituted 3.62 g of the purified dye, 6.15-dimethoxy-5,14-diaza-isoviolanthrone (formula I with $R = CH_3$). This dye, applied on cotton according to the procedure of Example 6, or according to the principal method RN of ACNA (*Color Index*, A/Q 1) exhibited the same characteristics of the dye prepared according to Example 1, but with a slightly more reddish color.

EXAMPLE 11

40 grams of aza-hydroxy-benzanthrone, passed through a screen with 350 meshes per sq cm, was dissolved in 400 g of concentrated sulphuric acid by admixing them in small portions and under constant stirring. This solution was then stirred at room temperature for another 30 minutes, after which 28 g of bromine was added dropwise. The temperature was then raised to 50°C and the solution was stirred for another 4 hours. The mixture was poured into about 1 liter of water and ice. It was filtered and washed until the acidity disappeared. The paste was squeezed and suspended in 155 ml of water containing 25 g of potassium hydroxide. The suspension was then heated under reflux at from 150° to 110°C for 105°-minutes while stirring vigorously. Thereupon it was diluted with 220 cc of water, cooled to 15°C and in 30 minutes 55 g of dimethylsulfate was introduced. After 4 hours of stirring a further 5 g of potassium hydroxide was added. The mixture was stirred for another hour. The mixture was heated for half an hour at 50°C and then filtered under heat. It was washed with boiling water until it was neutral. The mass was then dried in an oven at 100°C, and 50 g of the raw bromo-methoxy-derivative was obtained in the form of yellow crystals from dimethylformamide (DMF) (m.p. 257° to 260°C).

Into a 100 ml flask, fitted with a stirrer, thermometer, and a coolant was introduced 29 ml of ethanol and 0.585 g of sulphur. In small pieces, 1.05 g of metallic sodium was added so that the temperature did not exceed 70°C. When the solution had become clear, the mixture was mixed with 10 g of bromo-methoxy-aza-benzanthrone, and the mixture was heated under reflux for 20 hours with vigorous stirring. The mixture was cooled, diluted with water, filtered, washed and dried. 7.2 g of the crude 3,3'-thiobis-(1-aza-2-methoxy-benzanthrone) were obtained.

6.4 g of this product together with 23 g of potassium hydroxide dissolved in 53 ml of isobutanol were heated for 4 hours, under a nitrogen atmosphere at 120°C. The product was diluted with 250 ml of water and for half an hour air was blown into it. The whole was then filtered, washed with water until a clear filtrate was obtained, washed again with acetone and finally dried.

4.5 g of crude 6,15-dimethoxy-5,14-diaza-isoviolanthrone was obtained. 4.4 g of this crude dye was purified by boiling under reflux and stirring with 2.2 g of sodium carbonate, 4.4 g of methyl p-toluenesulfonate and 88 ml of nitrobenzene. The reaction water was removed by distillation with a small amount of nitrobenzene. The whole was then filtered at 120°C and then washed with nitrobenzene, acetone, acidified water and hot water. 2.8 grams of pure 6,15-dimethoxy-5,14-diaza-isoviolanthrone was obtained.

EXAMPLE 12

In a 500 ml glass reactor with anchor type stirrer and a thermometer, having a nitrogen atmosphere 15 g of finely powdered sodium sulfide (a technical product with a purity of 60 percent) were suspended in 200 ml of 99 percent ethanol. 68 g of a finely powdered 1-aza-2-methoxy-3-bromo-benzanthrone prepared according to Example 9 was then introduced.

The mixture was then heated under reflux for 24 hours while stirring vigorously. At the end of this reaction the mass was diluted with water, then filtered under a nitrogen atmosphere, washed until a colorless filtrate is obtained, and finally dried in an oven at 100°C. 30.5 g of crude 3,3'-thiobis-(1-aza-methoxy-benzanthrone) were obtained.

12.8 g of the sulfide of the previous preparation were finely ground and introduced under a nitrogen atmosphere into a mixture of 106 ml of isobutanol and 46 g of potassium hydroxide, heated beforehand to 120°C and vigorously stirred. While stirring, the mixture was heated for 4 hours at from 120° to 125°C, and at the end of the reaction the mixture was poured into water.

Air was injected into the reactor and thereafter the mass was filtered, washed and dried in an oven at 120°C. There were obtained 10.8 g of the crude dye which, when purified as in Example 9, yielded 7.4 g of the pure 6,15-dimethoxy-5,14-diaza-isoviolanthrone.

What is claimed is:

1. A compound of the formula

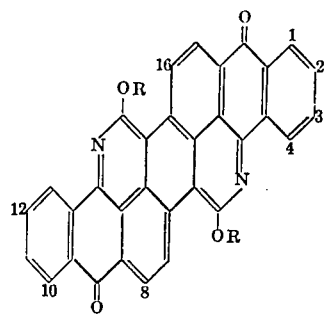

(I)

wherein R is a lower alkyl group having one to four carbon atoms.

2. The compound of claim 1, wherein R is methyl.
3. The compound of claim 1, wherein R is ethyl.
4. The compound of claim 1, wherein R is n-propyl.
5. The compound of claim 1, wherein R is iso-propyl.
6. The compound of claim 1, wherein R is n-butyl.
7. The compound of claim 1, wherein R is sec-butyl.
8. The compound of claim 1, wherein R is tert-butyl.

* * * * *